(12) United States Patent
Takaoka et al.

(10) Patent No.: US 9,891,814 B2
(45) Date of Patent: Feb. 13, 2018

(54) DISPLAY CONTROL APPARATUS AND METHOD FOR DISPLAYING INFORMATION RELATED TO ICONS

(75) Inventors: Ryo Takaoka, Tokyo (JP); Takashi Nunomaki, Kanagawa (JP); Ryoko Amano, Tokyo (JP); Kenzo Nishikawa, Tokyo (JP); Ritsuko Kano, Tokyo (JP); Shunichi Kasahara, Kanagawa (JP); Tomoya Narita, Kanagawa (JP)

(73) Assignee: Sony Corporation, Tokyo (JP)

( * ) Notice: Subject to any disclaimer, the term of this patent is extended or adjusted under 35 U.S.C. 154(b) by 146 days.

(21) Appl. No.: 13/324,463

(22) Filed: Dec. 13, 2011

(65) Prior Publication Data

US 2012/0176398 A1   Jul. 12, 2012

(30) Foreign Application Priority Data

Dec. 21, 2010 (JP) ................. 2010-284320

(51) Int. Cl.
G06F 3/0488 (2013.01)
G06F 3/048 (2013.01)
G06F 3/0482 (2013.01)

(52) U.S. Cl.
CPC .......... *G06F 3/04883* (2013.01); *G06F 3/048* (2013.01); *G06F 3/0482* (2013.01); *G06F 3/0488* (2013.01)

(58) Field of Classification Search
CPC ........ G09G 5/02; G09G 5/006; G06T 11/001; G06F 3/0482; G06F 3/0488; G06F 3/048; G06F 3/041; G06F 3/0481; G06F 3/016; G06F 3/011; G06F 3/038; G06F 3/04883; G06F 3/044

USPC ........................................ 345/589
See application file for complete search history.

(56) References Cited

U.S. PATENT DOCUMENTS

| | | | |
|---|---|---|---|
| 6,717,589 B1 * | 4/2004 | Grillo | G06F 9/4446 715/711 |
| 2005/0071761 A1 * | 3/2005 | Kontio | 715/711 |
| 2005/0253808 A1 * | 11/2005 | Yoshida | 345/156 |
| 2006/0220894 A1 * | 10/2006 | Stimson et al. | 340/815.4 |
| 2006/0239588 A1 | 10/2006 | Hull et al. | |

(Continued)

FOREIGN PATENT DOCUMENTS

EP   1815313 A1   8/2007
JP   2003-005912 A   1/2003

(Continued)

OTHER PUBLICATIONS

NDesign Studio, "CSS Dock Menu", posted on May 8, 2007, NDesign Studio Blog, http://ndesign-studio.com/blog/css-dock-menu.*

(Continued)

*Primary Examiner* — Sarah Le
(74) *Attorney, Agent, or Firm* — Chip Law Group

(57) ABSTRACT

A display control apparatus, method and computer program storage device detect when an object is in a proximity position relative to a display. In response, a display state of a displayed item is changed. Then, a processing circuit causes a relation item to be displayed adjacent to the proximity position, the relation item being related to the displayed item. The displayed state may be changed in size, position, color and other ways to reflect the recognition of the object being detected as being proximate to a predetermined proximity location.

18 Claims, 7 Drawing Sheets

(56) References Cited

U.S. PATENT DOCUMENTS

| | | | |
|---|---|---|---|
| 2009/0239588 A1* | 9/2009 | Nam .............................. 455/566 |
| 2009/0265670 A1 | 10/2009 | Kim et al. |
| 2009/0289914 A1* | 11/2009 | Cho .............................. 345/173 |
| 2009/0295715 A1 | 12/2009 | Seo et al. |
| 2009/0315848 A1* | 12/2009 | Ku et al. ....................... 345/173 |
| 2010/0145948 A1* | 6/2010 | Yang ................. G06F 17/30241 |
| | | | 707/737 |
| 2010/0153876 A1* | 6/2010 | Kim et al. .................... 715/800 |
| 2010/0306650 A1* | 12/2010 | Oh et al. ....................... 715/702 |

FOREIGN PATENT DOCUMENTS

| | | |
|---|---|---|
| JP | 2006-236143 A | 9/2006 |
| JP | 2007-108841 | 4/2007 |
| JP | 2009-116583 A | 5/2009 |
| WO | 2006048028 A1 | 5/2006 |
| WO | WO 2010/113397 A1 | 10/2010 |

OTHER PUBLICATIONS

U.S. Appl. No. 13/314,486, filed Dec. 8, 2011, Takaoka, et al.
U.S. Appl. No. 13/281,490, filed Oct. 26, 2011, Amano, et al.
U.S. Appl. No. 13/285,031, filed Oct. 31, 2011, Nunomaki.
U.S. Appl. No. 13/285,031, filed Nov. 9, 2011, Nunomaki.
U.S. Appl. No. 14/000,762, filed Aug. 21, 2013, Nishikawa, et al.
Office Action dated Jun. 3, 2014 in Japanese Patent Application No. 2010-284320 (with English language translation).
Extended European Search Report of EP Application No. 11192941.0, dated Jul. 29, 2016, 10 pages.

* cited by examiner

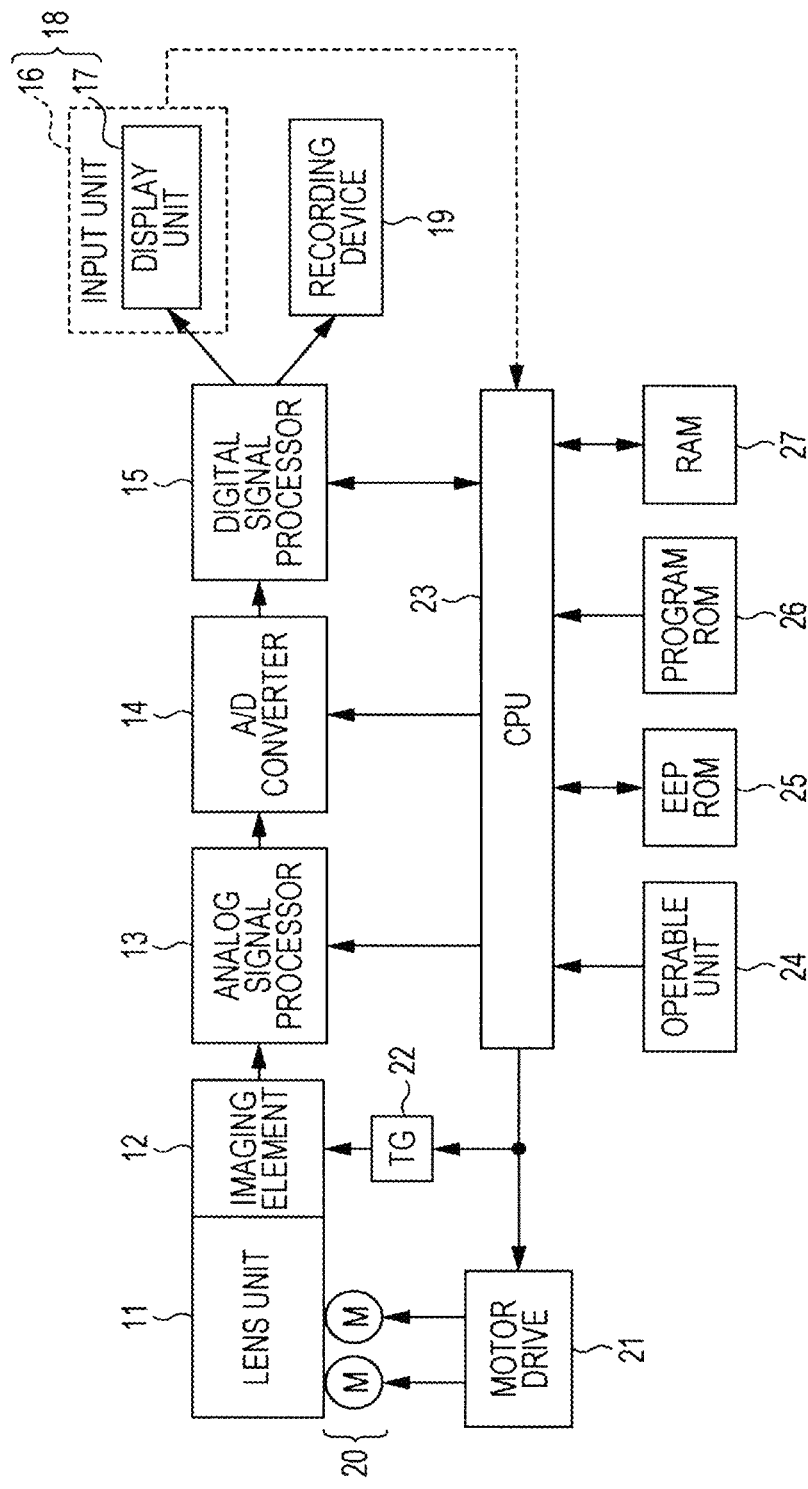

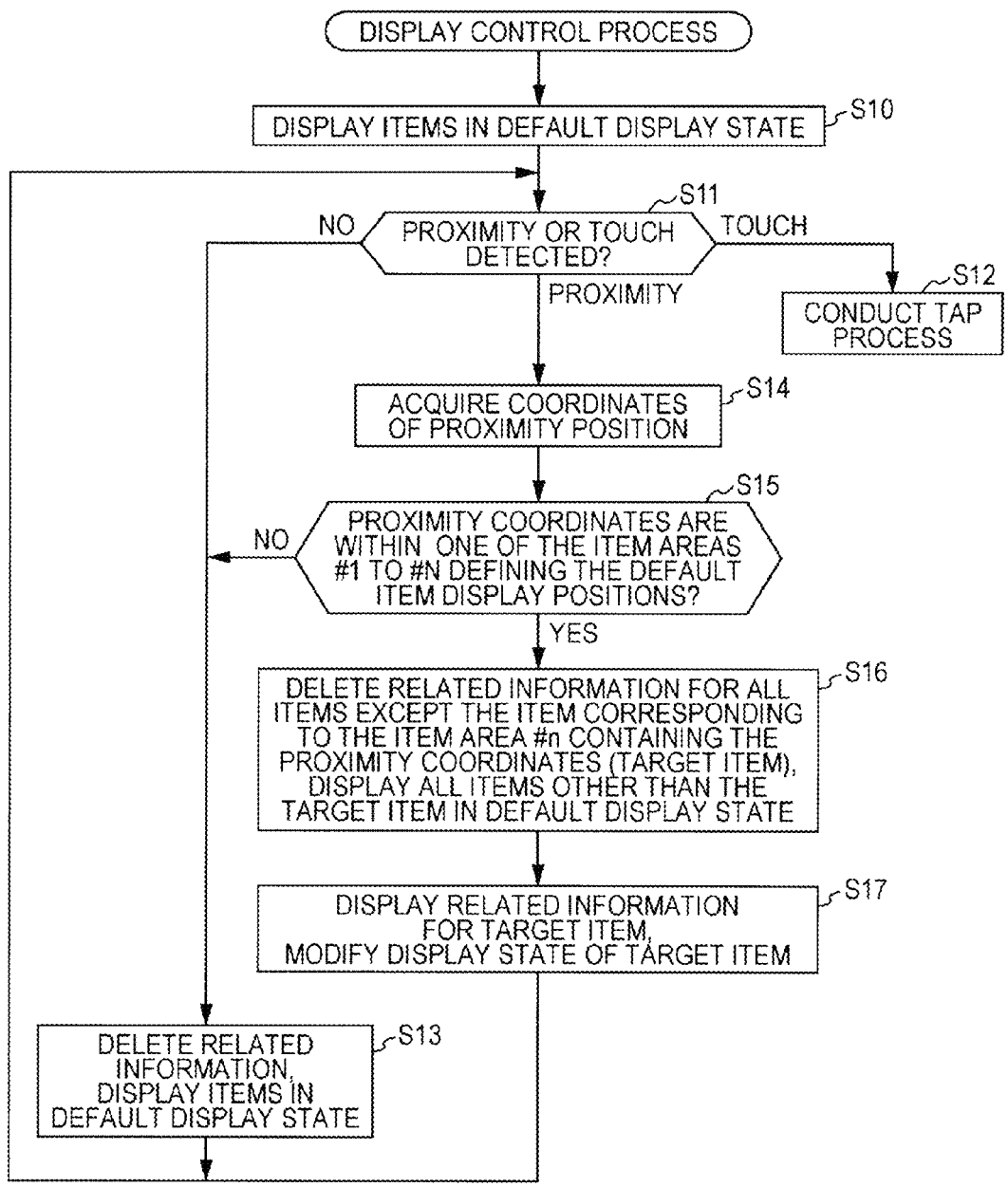

DISPLAY CONTROL APPARATUS AND METHOD FOR DISPLAYING INFORMATION RELATED TO ICONS

BACKGROUND

The present technology relates to a display control apparatus, a display control method, and a computer program product, and more particularly to a display control apparatus, a display control method, and a computer program product that display related information related to items such as icons such that they can be easily recognized by a user.

For example, with electronic devices such as personal computers (PCs), digital cameras, mobile terminals, TVs (television receivers), and car navigation apparatus, icons may be implemented as a user interface whereby a user supplies input to an electronic device.

In a user interface implementing icons, there are display methods that display explanatory messages explaining what an icon represents. For example, there is a method that displays a static explanatory message, and a method that displays an explanatory message for an icon in the case where a cursor that moves according to operations of directional keys or other cursor keys is positioned over that icon.

Meanwhile, as a user interface implementing icons, there is for example a user interface using a touchscreen, wherein a display panel such as a liquid crystal panel that displays icons, etc. and a touch panel that detects touches by the user's finger, etc. are integrated together.

In a user interface that uses a touchscreen, a function assigned to an icon displayed on the touchscreen is executed when that icon is touched.

As above, in a user interface that uses a touchscreen, since a function assigned to an icon is executed when triggered by that icon being touched, it may be difficult to use the touching of an icon as a trigger for displaying an explanatory message for that icon.

For this reason, in a user interface that uses a touchscreen, a guide icon (button) for guidance is provided, for example, and an explanatory message for a desired icon is displayed when the desired icon is touched after touching the guide icon.

In contrast, in recent years there have been proposed display methods that use a display panel which detects the proximity of a user's finger, etc., and display a menu when the user's finger, etc. comes into proximity with the display panel (see Japanese Unexamined Patent Application Publication No. 2007-108841, for example).

SUMMARY

As discussed above, with a method that displays an explanatory message for an icon that is touched after touching a guide icon, a user first touches the guide icon and then also touches the desired icon, which is inconvenient.

Also, with a method that displays an explanatory message for an icon that is touched after touching a guide icon, it is difficult to display an explanatory message for the guide icon. Furthermore, it is difficult for a user who does not know how to use the guide icon to view explanatory messages.

Meanwhile, in electronic devices, there is increasing adoption of a user interface that displays icons or items such as text strings arrayed in a list format, and conducts given processing in the case where a user touches an item.

Consequently, proposals are being demanded for technology that enables a user to easily recognize related information related to items, such as an explanatory message which explains what an item displayed on a display panel represents.

The present technology, being devised in light of such circumstances, is configured to enable a user to easily recognize related information related to an item such as an icon, for example.

In one embodiment, a display control apparatus includes
a processing circuit that
detects when an object is in a proximity position relative to a display and changes a display state of a displayed item when the object is detected as being in the proximity position, and
causes a relation item to be displayed at a position adjacent to the proximity position, the relation item being related to the displayed item.

One aspect of the apparatus is that
the processing circuit changes a size of the displayed item in response to the object being detected in the proximity position.

Another aspect of the apparatus is that
the processing circuit changes the display state by moving the displayed item to a different display location.

Another aspect of the apparatus is that
the processing circuit includes a detector that detects when the object is in the proximity position.

Another aspect of the apparatus is that
the relation item includes at least one of a function name of a function and an explanation of the function.

Another aspect of the apparatus is that
the displayed item is part of a matrix of displayed icons.

Another aspect of the apparatus is that
the relation item is displayed in a popup form.

Another aspect of the apparatus is that
the processing circuit also detects a touch of the object to the display, and processes the touch differently than when the object is in the proximity position.

Another aspect of the apparatus is that
the processing circuit subsequent removes the relation item from the display when the processing circuit detects that the object has been moved away from the display.

Another aspect of the apparatus is that
the processing circuit deletes related information for other icons in the matrix of display icons that are not adjacent to the proximity position.

Another aspect of the apparatus is that
the processing circuit also displays a relation item for another displayed item when the object is detected as also being proximate to the another displayed item.

Another aspect of the apparatus is that
the processing circuit changes a display state for a plurality of displayed items when the object is detected in the proximity position.

Another aspect of the apparatus is that
the relation item is displayed as text strings arrayed in a list format.

Another aspect of the apparatus is that
the text strings are displayed as user-actuatable buttons.

Another aspect of the apparatus is that
the processing circuit changes at least one of a color and a brightness of the displayed item in response to the object being detected in the proximity position.

According to an exemplary display control method, the method includes detecting with a proximity detector when an object is in a proximity position relative to a display;

changing a display state of a displayed item in response to the detecting, and causing with a processing circuit a relation item to be displayed at a position adjacent to the proximity position, the relation item being related to the displayed item.

According to an aspect of the method, the causing includes changing a size of the displayed item in response to the object being detected in the proximity position.

According to another aspect of the method, the causing includes changing the display state by moving the displayed item to a different display location.

According to another aspect of the method, the relation item includes at least one of a function name of a function and an explanation of the function.

According to an exemplary non-transitory computer readable storage device embodiment, the device has instructions that when executed by a processing circuit implement a method, the method includes detecting with a proximity detector when an object is in a proximity position relative to a display;

changing a display state of a displayed item in response to the detecting, and causing with the processing circuit a relation item to be displayed at a position adjacent to the proximity position, the relation item being related to the displayed item.

According to an embodiment of the present technology, a user is able to easily recognize related information related to an item displayed by a display apparatus.

BRIEF DESCRIPTION OF THE DRAWINGS

FIG. 1 is a block diagram illustrating an exemplary configuration of an embodiment of a digital camera to which the present technology has been applied;

FIG. 6 is a flowchart explaining a display control process conducted by a display control apparatus.

DETAILED DESCRIPTION OF EMBODIMENTS

Figure 2A:
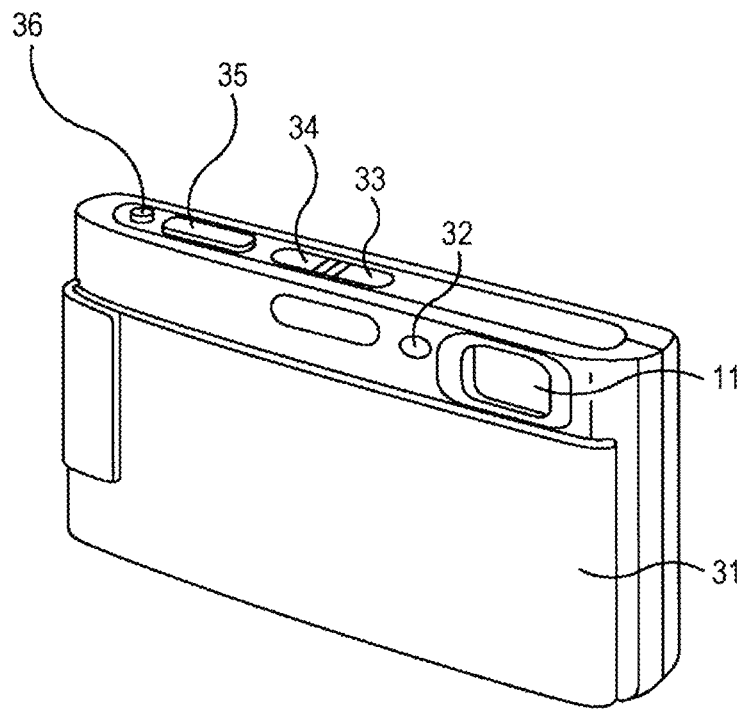
FIGS. 2A and 2B are perspective diagrams illustrating an exemplary exterior configuration of a digital camera.

[Embodiment of Digital Camera to which the Present Technology has been Applied]

FIG. 1 is a block diagram illustrating an exemplary configuration of an embodiment of a digital camera (digital still camera) to which the present technology has been applied.

A lens unit 11 includes an imaging lens, diaphragm, focus lens, etc. Light entering the lens unit 11 irradiates an imaging element 12.

The imaging element 12 includes for example a charge-coupled device (CCD) or a complementary metal-oxide-semiconductor (CMOS) imager, etc. The imaging element 12 photoelectrically converts light from the lens unit 11, and supplies an analog image signal obtained as a result to an analog signal processor 13.

The analog signal processor 13 performs analog signal processing such as correlated double sampling or automatic gain adjustment on the image signal from the imaging element 12, and supplies the result to an analog/digital (A/D) converter 14.

The analog/digital (A/D) converter 14 A/D converts the image signal from the analog signal processor 13, and supplies digital image data obtained as a result to a digital signal processor 15.

The digital signal processor 15 performs digital signal processing such as white balance adjustment, noise removal, and appropriate compression coding (such as Joint Photographic Experts Group (JPEG) coding, for example) on the image data from the A/D converter 14, and supplies the result to (the display unit 17 of) an input/output panel 18 and a recording device 19.

The input/output panel 18 includes an input unit 16 and a display unit 17.

The input unit 16 is a device that includes functions for receiving (detecting) external input. Namely, the input unit 16 includes, for example, a capacitive or other touch panel, or a set combining a light source that radiates light and a sensor that receives a reflection of that light off an object.

When the input unit 16 is put in proximity to or touched by an external object, or in other words the user's finger or a touch pen wielded by the user, for example, the input unit 16 supplies the CPU 23 with a signal expressing the position where that proximity or touch occurred.

The display unit 17 is a device that displays an image (a display apparatus). Namely, the display unit 17 includes a liquid crystal panel, for example, and displays an image according to image data, etc. supplied from the digital signal processor 15.

The input/output panel 18 is an integration of an input unit 16 and a display unit 17 like the above. The input/output panel 18 is able to display an image with the display unit 17, and receive external operational input (herein being both touch and proximity) with respect to an image displayed by the display unit 17 with the input unit 16.

A disc such as a Digital Versatile Disc (DVD), semiconductor memory such as a memory card, or other removable recording medium (not illustrated) can be loaded into or removed from the recording device 19, for example. The recording device 19 conducts recording and playback control of image data with respect to a loaded recording medium.

In other words, the recording device 19 records image data from the digital signal processor 15 onto a recording medium, or alternatively, reads out image data recorded onto a recording medium and supplies it to the digital signal processor 15.

The actuator 20 is a motor that adjusts the focus lens and diaphragm of the lens unit 11, and is driven by the motor drive 21.

The motor drive 21 drives the actuator 20 following control by the central processing unit (CPU) 23.

The timing generator (TG) 22, following control by the CPU 23, supplies the imaging element 12 with a timing signal for adjusting the exposure time, etc.

The CPU 23 controls the respective blocks constituting the digital camera by executing a program stored in the program read-only memory (ROM) 26, and as appropriate, a program stored in the electrically erasable programmable ROM (EEPROM) 25.

The operable unit 24 includes physical buttons, etc. operated by the user, and supplies the CPU 23 with a signal corresponding to the user's operation.

The EEPROM 25 stores data and programs which should be saved even when the digital camera is powered off, such as imaging parameters, etc. set by the user operating the operable unit 24, for example.

The program ROM 26 stores programs executed by the CPU 23, etc.

the RAM 27 temporarily stores data and programs involved in operations by the CPU 23.

In a digital camera configured as above, the CPU 23 controls the respective units of the digital camera by executing a program stored in the program ROM 26, etc.

Meanwhile, light entering the lens unit 11 is photoelectrically converted by the imaging element 12, and the image signal obtained as a result is supplied to the analog signal processor 13. In the analog signal processor 13, analog signal processing is performed on the image signal from the imaging element 12, and the result is supplied to the A/D converter 14.

In the A/D converter 14, the image signal from the analog signal processor 13 is A/D converted, and the digital image data obtained as a result it supplied to the digital signal processor 15.

In the digital signal processor 15, digital signal processing is performed on the image data from the A/D converter 14, the result is supplied to the (display unit 17 of) the input/output panel 18, and a corresponding image, or in other words a through-the-lens image, is displayed.

Also, the CPU 23 executes given processing following signals from the (input unit 16 of) the input/output panel 18 and the operable unit 24.

In other words, if the input/output panel 18 or operable unit 24 are operated so as to conduct imaging, for example, the CPU 23 conducts processing for imaging a still image as a photograph, causes the digital signal processor 15 to perform compression coding on image data from the A/D converter 14, and causes the result to be recorded onto a recording medium via the recording device 19.

Also, if the input/output panel 18 or the operable unit 24 is operated so as to conduct playback, for example, the CPU 23 causes image data to be read out from a recording medium via the recording device 19 by controlling the digital signal processor 15.

Additionally, the CPU 23 causes the digital signal processor 15 to decompress the image data read out from the recording medium and supply it to the input/output panel 18 for display.

Also, the CPU 23 causes (images of) items such as icons or text strings arrayed in a list format to be supplied to the input/output panel 18 and displayed via the digital signal processor 15 as a user interface.

Additionally, the CPU 23 causes related information related to an item to be supplied to the input/output panel 18 and displayed via the digital signal processor 15 in response to a signal from (the input unit 16 of) the input/output panel 18.

Herein, (image) data for items and related information is stored in the EEPROM 25 or the program ROM 26, for example.

Besides the above, the CPU 23 generates an image of a focus frame (AF frame) used for focus control and supplies it to the input/output panel 18 via the digital signal processor 15 for display, for example.

Herein, the digital camera includes, for example, AF (Auto focus) functions, AE (Auto Exposure) functions, AWB (Auto White Balance) functions, etc. These functions are realized by the CPU 23 executing a program.

For example, display of an AF frame on the input/output panel 18 is conducted by AF functions. The position of an AF frame displayed on (the display screen of the display unit 17 of) the input/output panel 18 can be moved by operations that move the position of the AF frame with respect to the input/output panel 18. Also, the size of an AF frame display on (the display screen of the display unit 17 of) the input/output panel 18 can be modified by operations that modify the size of the AF frame with respect to the input/output panel 18.

Herein, a program executed by the CPU 23 may be installed onto the digital camera from a removable recording medium, or downloaded via a network and installed onto the digital camera, for example.

Figure 2B:
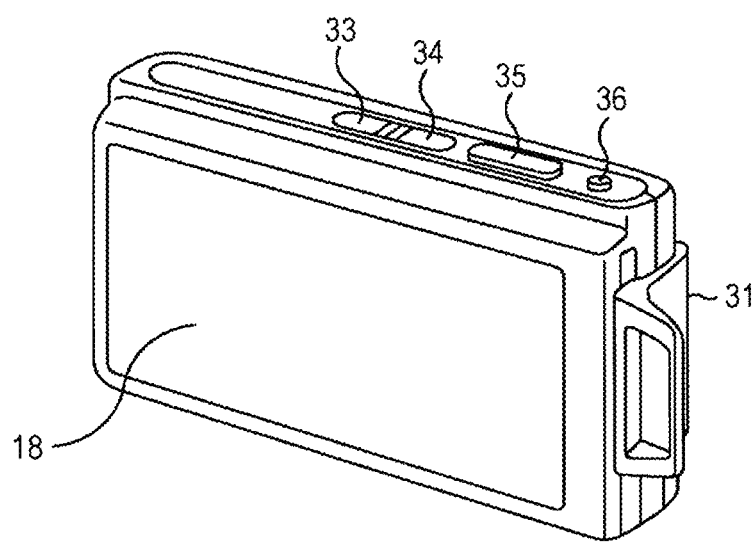

FIGS. 2A and 2B are perspective diagrams illustrating an exemplary exterior configuration of a digital camera.

Namely, FIG. 2A is a perspective view of the front side (the side facing a subject during imaging) of the digital camera, while FIG. 2B is a perspective view of the rear side of the digital camera.

A lens cover 31 is provided so as to cover the front of the digital camera, and is movable up and down.

When the lens cover 31 is positioned upwards, the lens unit 11, etc. enters a covered state. Also, when the lens cover 31 is positioned downwards, the lens unit 11, etc. are exposed, and the digital camera enters a state where imaging is possible.

In FIG. 2A, the lens cover 31 is positioned downward, and the lens unit 11 is exposed.

On the left side of the lens unit 11, an AF illuminator 32 is provided. The AF illuminator 32 emits light (assist light) for illuminating a subject in cases where the subject is dark and it is difficult to focus using AF functions, for example.

Herein, in the case of imaging using a self-timer, the AF illuminator 32 also functions as a self-timer lamp that emits light for informing the user of the imaging timing by the self-timer.

On the top of the digital camera are provided a power button 33, a play button 34, a shutter button (release button) 35, and a zoom lever 36, which constitute the operable unit 24 in FIG. 1.

The power button 33 is operated when switching the digital camera power on and off. The play button 34 is operated when playing back image data recorded onto a recording medium loaded into the recording device 19 (FIG. 1).

The shutter button (release button) 35 is operated when recording image data onto a recording medium loaded into the recording device 19 (FIG. 1) (taking a photograph (still image)). The zoom lever 36 is operated when adjusting the zoom.

On the back of the digital camera, the input/output panel 18 is provided. A through-the-lens image is displayed on the input/output panel 18. Also, (images of) items such as icons or text strings arrayed in a list format, and related information related to items, etc., are displayed on the input/output panel 18.

The user is able to supply various (operational) input to the digital camera by causing a finger or touch pen, etc. to come into proximity to or touch the input/output panel 18.

[Exemplary Configuration of Display Control Apparatus]

Figure 3:
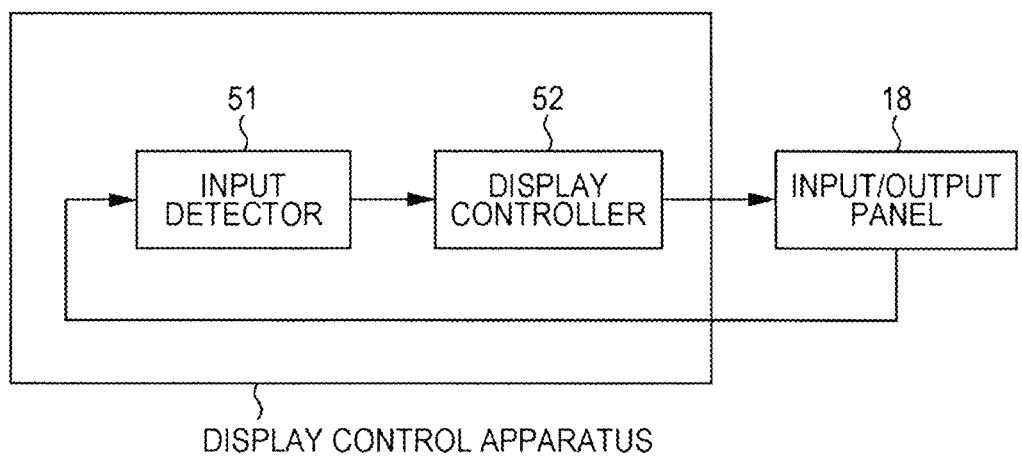
FIG. 3 is a block diagram illustrating an exemplary functional configuration of a display control apparatus.

FIG. 3 is a block diagram illustrating an exemplary functional configuration of a display control apparatus, given as the CPU 23 in FIG. 1, which conducts display control.

In the digital camera in FIG. 1 herein, the CPU 23 conducts display control, which displays items such as icons or text strings arrayed in a list format and related information for the items on the input/output panel 18.

FIG. 3 illustrates an exemplary functional configuration of a display control apparatus, given as the CPU 23, which conducts such display control.

The display control apparatus includes an input detector 51 and a display controller 52.

The input detector 51 is supplied with a signal from (the input unit 16 of) the input/output panel 18. The signal (hereinafter also called a stimulus signal) is in response to external stimulus (input) imparted to (the input unit 16 of) the input/output panel 18.

The input detector 51, on the basis of a stimulus signal from (the input unit 16 of) the input/output panel 18, detects external input with respect to (the input unit 16 of) the input/output panel 18. In other words, the input detector 51 detects that the user's finger or a touch pen, etc. wielded by the user has been put in proximity to or made to touch, and the position, etc. (on the input/output panel 18) of that proximity or touch, for example. The input detector 51 supplies the result to the display controller 52 as operation information expressing the operation conducted on the input/output panel 18 by the user.

The display controller 52 conducts display control as appropriate, which displays items such as icons on (the display unit 17 of) the input/output panel 18. Data for such items is stored in the EEPROM 25 or program ROM 26.

Also, in the case where operation information from the input detector 51 expresses proximity of an object with respect to the display screen of the input/output panel 18, the display controller 52 takes the item being displayed near the proximity position in proximity to the object to be a target item to be targeted, changes the display state of that target item, and conducts a display control that displays related information for the target item on the input/output panel 18. Data for such related information is stored in the EEPROM 25 or the program ROM 26.

[Exemplary Display on Input/Output Panel 18]

FIGS. 4A to 4D illustrate a first exemplary display on the display screen of (the display unit 17 of) the input/output panel 18.

Figure 4A:
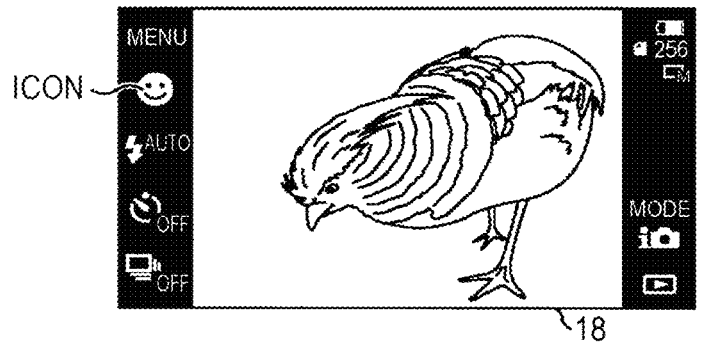
FIGS. 4A to 4D illustrate a first exemplary display of a display screen on an input/output panel 18.

FIG. 4A illustrates an exemplary display on the display screen of the input/output panel 18 in a state where not object is in proximity or touching, for the case where the digital camera is in an imaging standby state.

Herein, an imaging standby state means a state in which imaging of a photograph (still image) will be conducted if the shutter button 35 (FIG. 2) is operated (a state in which an image will be imaged and recorded onto a recording medium loaded into the recording device 19 (FIG. 1)).

In FIG. 4A, a through-the-lens image is displayed on the input/output panel 18 except in the left and right portions of the display screen, while icons assigned with given functions are displayed at a predetermined default size at predetermined default positions on the left and right of the display screen (the icons are displayed in a predetermined default display state).

Herein, a function assigned to an icon may be a function whereby given processing is executed by touching that icon, such as auto imaging which automatically configures the digital camera with imaging parameters, etc. or switching a smile shutter on and off which conducts imaging when a smile is detected, for example. An assigned function may also be a function that displays the state of the digital camera, such as the remaining battery charge or the number of photographs (still images) which can be imaged.

Figure 4B:
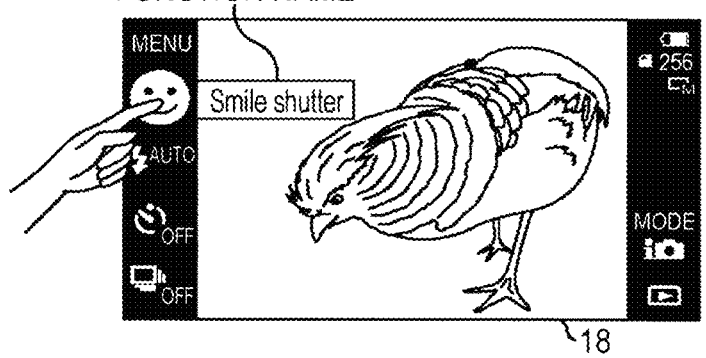

FIG. 4B displays an exemplary display on the display screen of the input/output panel 18 in the case where the user has put his or her finger (or a touch pen or other object) in proximity to an icon displayed uppermost on the left side from among the icons displayed on the display screen in FIG. 4A, for example.

In FIG. 4B, the display state of the icon put in proximity to the finger by the user has been changed. Namely, the icon put in proximity to the finger by the user is displayed at an enlarged size that has been enlarged from the default size.

Furthermore, in FIG. 4B, the function name "Smile shutter" of the function assigned to the icon put in proximity to the finger by the user is displayed near that icon.

Since the function name of the function assigned to the icon put in proximity to the finger by the user is displayed as above, the user is easily able to recognize the function assigned to that icon given by related information related to the icon, by merely putting his or her finger in proximity to the icon and without performing a complicated operation.

Also, since the icon whose function name is displayed is displayed at an enlarged size, the user is easily able to recognize which icon's function name is being displayed.

Herein, the function assigned to the icon with the function name "Smile shutter" (hereinafter also called the smile icon) is a function whereby processing for switching auto imaging on and off is executed by touching that icon.

Consequently, if the user puts his or her finger in proximity to the smile icon, the smile icon is displayed at an enlarged size, while the function name "Smile shutter" is also displayed as related information for that smile icon. Then, if the user touches the smile icon with his or her finger, auto imaging is switched on or off.

The user is able to view the function name displayed by putting his or her finger in proximity to the smile icon. Thus, the user is able to touch the smile icon with assurance, so to speak, after having ascertained (to some degree) the function assigned to that smile icon.

Figure 4C:
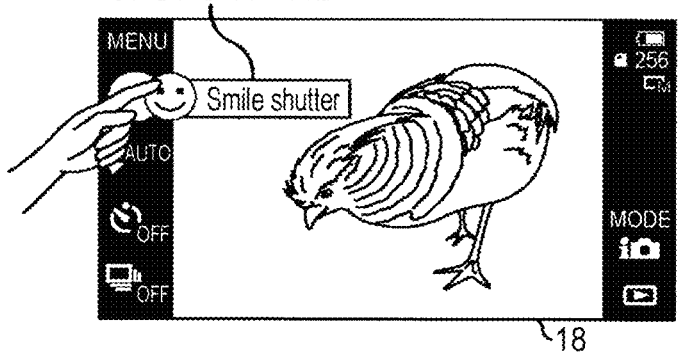

FIG. 4C illustrates another exemplary display on the display screen of the input/output panel 18 in the case where the user has put his or her finger in proximity to the smile icon displayed uppermost on the left side of the display screen in FIG. 4A.

In FIG. 4C, the function name "Smile shutter" of the function assigned to the smile icon put in proximity to the finger by the user is displayed, similarly to the case in FIG. 4B.

However, FIG. 4C differs from the case in FIG. 4B in that the smile icon put in proximity to the finger by the user is not displayed at an enlarged size, but is displayed at a displaced position displaced from the default position (in FIG. 4C, a position displaced from the default position towards the center of the display screen).

Since the function name of the function assigned to the icon put in proximity to the finger by the user is also displayed in the case of FIG. 4C similarly to the case in FIG. 4B, the user is easily able to recognize the function assigned to an icon simply by putting his or her finger in proximity.

Also, in FIG. 4C, since the icon put in proximity to the finger by the user is displayed displaced from the default position, the user is easily able to recognize which icon's function name is being displayed, similarly to the case of FIG. 4B wherein an icon is displayed at an enlarged size. Moreover, an icon can be prevented from becoming difficult to see as a result of the finger put in proximity to that icon by the user.

Furthermore, it is possible to display an icon put in proximity to the finger by the user at an enlarged size and displaced from its default position.

Figure 4D:
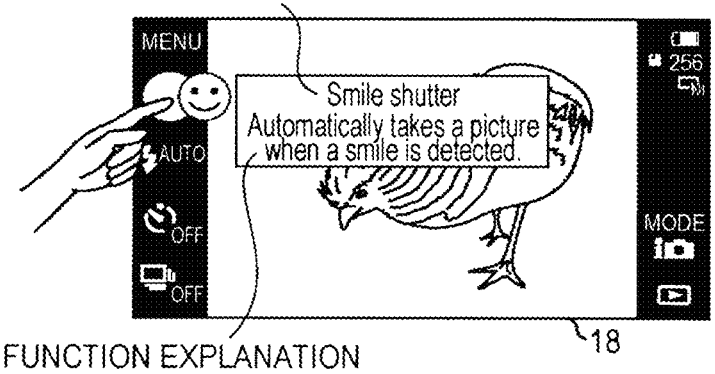

FIG. 4D illustrates another exemplary display on the display screen of the input/output panel 18 in the case where the user has put his or her finger in proximity to the smile icon displayed uppermost on the left side of the display screen in FIG. 4A.

In FIG. 4C, the function name "Smile shutter" of the function assigned to the smile icon put in proximity to the finger by the user is displayed, similarly to the case in FIG. 4B.

However, in FIG. 4D, the function name "Smile shutter" of the function assigned to the smile icon put in proximity to the finger by the user and a function explanation explaining that function are displayed.

As above, in the case where an explanatory text for an icon put in proximity to the finger by the user is displayed, the user is able to recognize the function assigned to the icon in more detail.

Furthermore, although both a function name and a function explanation are displayed in FIG. 4D, it is possible to display just the function explanation.

Herein, one or both of a function message and a function explanation will be called a function message.

Figure 5A:
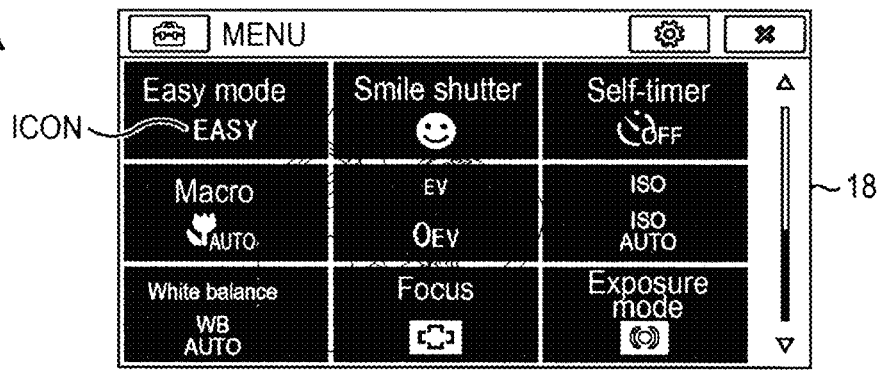
FIGS. 5A to 5C illustrate a second exemplary display of a display screen on an input/output panel 18.
Figure 5B:
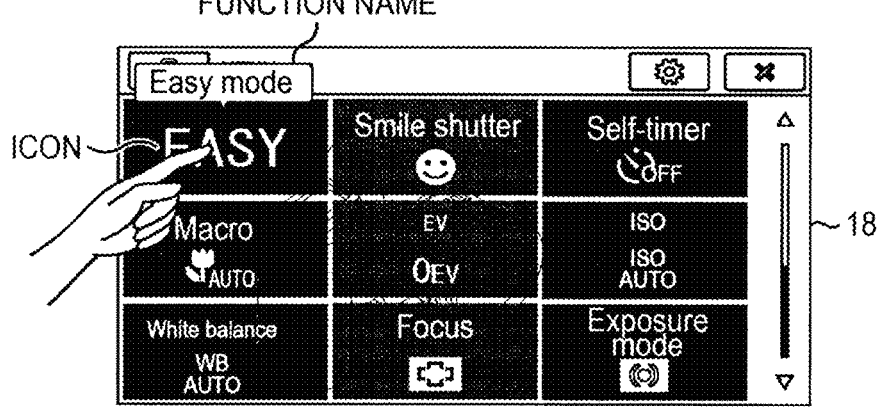
Figure 5C:
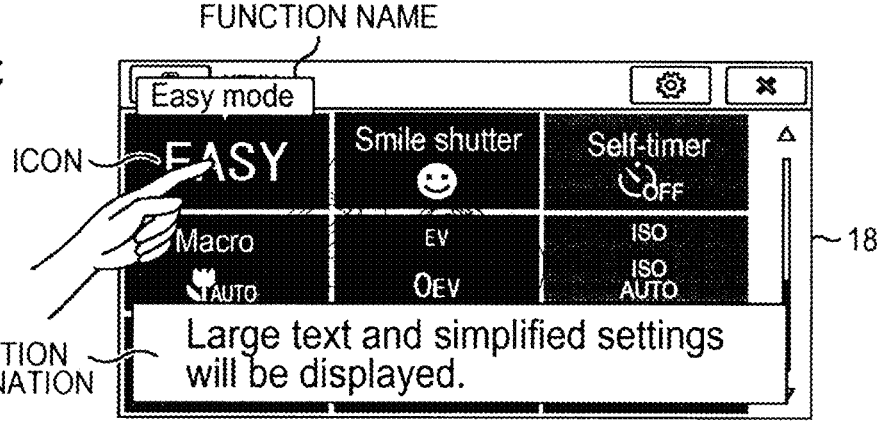

FIGS. 5A to 5C illustrate a second exemplary display of a display screen on the input/output panel 18.

FIG. 5A illustrates an exemplary display on the display screen of the input/output panel 18 in a state where a menu is displayed but an object is not in proximity or touching.

In FIG. 5A, a menu wherein icons are disposed in a matrix is being displayed on the input/output panel 18.

FIG. 5B illustrates an exemplary screen on the display screen of the input/output panel 18 in the case where the finger has put his or her finger in proximity to the icon disposed in the upper-left of the display screen in FIG. 5A.

In FIG. 5B, the icon put in proximity to the finger by the user is being displayed at an enlarged size enlarged from its default size.

Furthermore, in FIG. 5B, the function name "Easy mode" of the function assigned to the icon put in proximity to the finger by the user is being displayed in popup form near that icon.

FIG. 5C illustrates another exemplary display on the display screen of the input/output panel 18 in the case where the user has put his or her finger in proximity to the icon disposed in the upper-left of the display screen in FIG. 5A.

In FIG. 5C, the icon put in proximity to the finger by the user is displayed at an enlarged size and the function name "Easy mode" of the function assigned to that icon is displayed in popup form, similarly to the case in FIG. 5B. Moreover, a function explanation explaining that function is being displayed.

In the case in FIG. 5, by simply put his or her finger in proximity, the user is easily able to recognize the function assigned to an icon, and is easily able to recognize which icon's function message (function name, function explanation) is being displayed, similarly to the case in FIGS. 4A to 4D.

[Display Control Processing in Fullscreen Mode]

FIG. 6 is a flowchart explaining a display control process conducted by the display control apparatus in FIG. 3.

In an operation S10, the display controller 52 displays given items such as icons in a default display state on (the display screen of) the input/output panel 18, as illustrated in FIG. 4A to 4D or 5A to 5C, for example. The process proceeds to an operation S11.

Herein, the default display state is predetermined, and displaying icons in a default display state means displaying items such as icons at default positions and at default sizes, for example.

In operation S11, the display controller 52, on the basis of operation information supplied from the input detector 51, determines whether or not proximity or touch has been detected with respect to the display screen of the input/output panel 18.

In the case where it is determined in operation S11 that touch has been detected with respect to the display screen of the input/output panel 18, or in other words, in the case where the user has touched the input/output panel 18 with his or her finger, etc., the process proceeds to an operation S12, and the display controller 52 conducts a tap process according to the touched position on the input/output panel 18. The tap process is a predetermined process.

In contrast, in the case where it is determined in operation S11 that neither touch nor proximity has been detected with respect to the display screen of the input/output panel 18, the process proceeds to an operation S13, and if there is an item from among the items displayed by the input/output panel 18 whose display state has been modified in an operation S17 later discussed, the display controller 52 displays that item in its default display state (re-display). Furthermore, in the case where related information such as function message is being displayed by the input/output panel 18 in operation S17 later discussed, that related information is deleted, and the process returns to operation S11.

Also, in the case where it is determined in operation S11 that proximity has been detected with respect to the display screen of the input/output panel 18, or in other words, in the case where the user has put his or her finger, etc. in proximity to the input/output panel 18, the process proceeds to an operation S14, and the display controller 52 acquires the coordinates of the position on the input/output panel 18 where the finger, etc. was put in proximity to the input/output panel 18 (proximity position) from operation information supplied from the input detector 51. The process proceeds to an operation S15.

In operation S15, the display controller 52 determines whether or not the coordinates of the proximity position (proximity coordinates) are coordinates within an item area, which is a given area defining an item's display position on the input/output panel 18.

In other words, the item area for an item such as an icon displayed on the input/output panel 18, for example, is a predetermined area (region on the display screen) defining the display position (default position) on the display screen where that icon is displayed.

Herein, the item area for an icon is a rectangular, circular, or other area enclosing that icon, for example. In the case where a position subjected to touch or proximity is within (above) the icon's item area, the display controller 52 recognizes (determines) that that icon has been subjected to touch or proximity.

For example, if it is assumed that icons for N items are currently being displayed on the input/output panel 18, in operation S15 it is determined whether or not the proximity coordinates are coordinates within the item area of one of the respective item areas #1 to #N of the N items.

In the case where it is determined in operation S15 that the proximity coordinates are not coordinates within the item area of one of the N item areas #1 to #N, or in other words, in the case where although the user's finger, etc. came into proximity to the input/output panel 18, no icon exists around the proximity position subjected to that proximity (including the proximity position), and thus the user's finger, etc. came into proximity to a position not of one of the icons given as the N items, the process proceeds to operation S13 and a process similar to the case discussed above is conducted.

Then, the process returns from operation S13 to operation S11, and thereafter a similar process is repeated.

Also, in the case where it is determined in operation S15 that the proximity coordinates are coordinates within the item area of one of the N item areas #1 to #N, or in other words, in the case where the user's finger, etc. has come into proximity with one of the icons given as the N items displayed on the input/output panel 18, the process proceeds to an operation S16, and the display controller 52 takes the item corresponding to the item area #n that includes the proximity coordinates from among the item areas #1 to #N, or in other words, the item put in proximity with the user's finger, etc. (the item surrounding the proximity position put in proximity with the user's finger, etc.), as the target item.

Then, in operation S16, if there is an item from among the items displayed on the input/output panel 18, excepting the target item, whose display state has been modified in operation S17, the display controller 52 displays (re-displays) that item in its default display state. Furthermore, in the case where related information such as a function message for an item other than the target item is being displayed by the input/output panel 18, that related information is deleted, and the process proceeds to operation S17.

In operation S17, the display controller 52 displays related information for the target item on the input/output panel 18. In other words, the display controller 52 displays a function message for the icon put in proximity to the user's finger, etc. as related information for the target item, as illustrated in FIG. 4A to 4D or 5A to 5C, for example.

Furthermore, in operation S17, the display controller 52 modifies the display state of the target item. In other words, the display controller 52 displays the icon put in proximity to the user's finger, etc. as the target item by enlarging it to an enlarged size or displacing it from its default position, as illustrated in FIG. 4A to 4D or 5A to 5C, for example.

After that, the process returns from operation S17 to operation S11, and thereafter a similar process is repeated.
[Other Exemplary Display on Input/Output Panel 18]

Figure 7A:
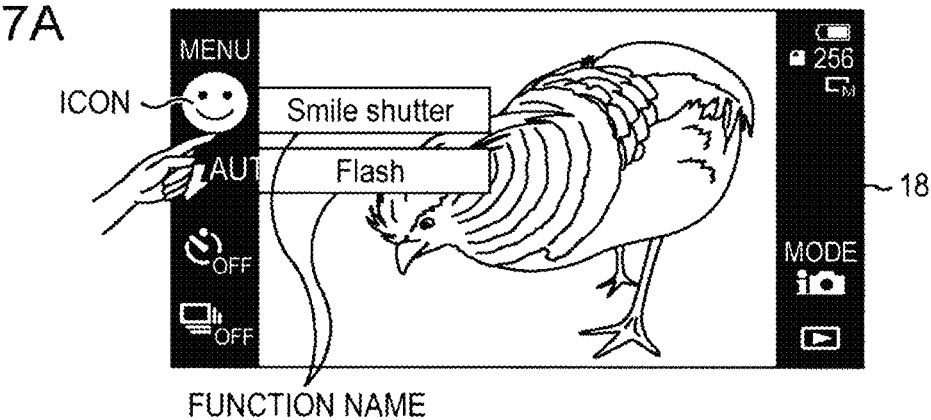
FIGS. 7A to 7C illustrate a third exemplary display of a display screen on an input/output panel 18.
Figure 7B:
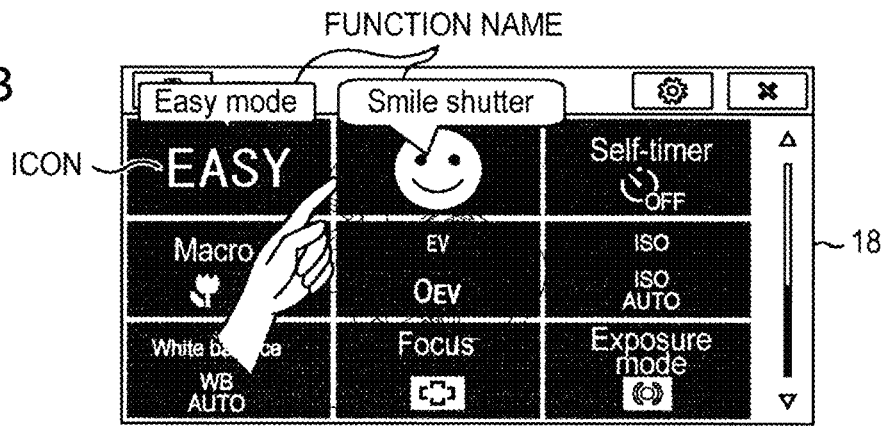
Figure 7C:
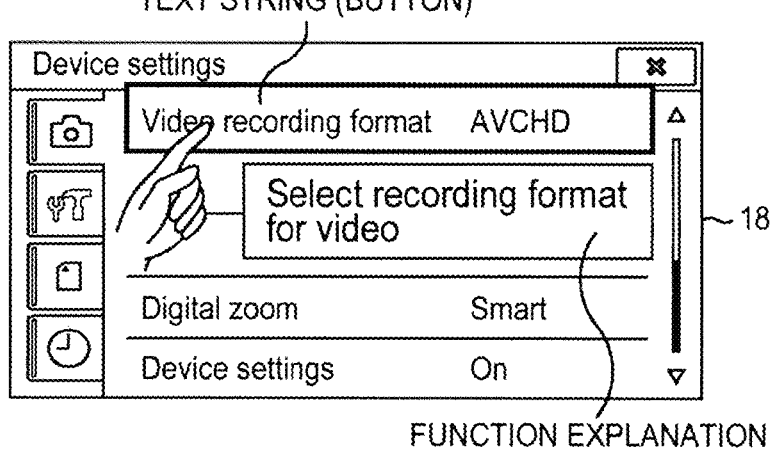

FIGS. 7A to 7C illustrate a third exemplary display on the display screen of the input/output panel 18.

FIG. 7A illustrates an exemplary display on the display screen of the input/output panel 18 in the case where a finger has been put in proximity to a position midway between two icons, namely the icon display uppermost on the left side of the display screen in FIG. 4A discussed earlier and the icon displayed below it.

In FIGS. 4A to 6, the display state was modified for one icon at the position put in proximity to the user's finger, etc. (proximity position) and a function message was displayed. However, the display state can be modified and a function message can be displayed for a plurality of icons.

In other words, in the case where items for a plurality of icons are being displayed near the proximity position put in proximity to the user's finger, etc., the display controller 52 may take each item in that plurality of items as a target item and modify the display state of each item in the plurality of target items while also displaying related information for each item in the plurality of target items.

In FIG. 7A, two icons being displayed near the position put in proximity to a finger by the user (proximity position), namely the icon displayed uppermost on the left side of the display screen in FIG. 4A and the icon displayed below it, have become target icons.

Furthermore, the two target icons are respectively being displayed at an enlarged size, and in addition, the function names of the functions respectively assigned to the those two target icons are being displayed.

FIG. 7B illustrates an exemplary display on the display screen of the input/output panel 18 in the case where the user puts a finger in proximity to a position midway between two icons, namely the icon disposed in the upper-left of the display screen in FIG. 5A discussed earlier, and the icon displayed to its right.

In FIG. 7B, two icons being displayed near the proximity position put in proximity to a finger by the user, namely the icon disposed in the upper-left of the display screen in FIG. 5A and the icon displayed to its right, have become target icons.

Furthermore, the two target icons are respectively being displayed at an enlarged size, and in addition, the function names of the functions respectively assigned to the those two target icons are being displayed in popup form.

As above, in the case of modifying the display state and display a function message for a plurality of icons such as two icons, the user is easily able to recognize, at the same time, the functions respectively assigned to the plurality of icons.

FIG. 7C illustrates an exemplary display on the display screen of the input/output panel 18 in which text strings arrayed in a list format are displayed as items which function as buttons.

In FIG. 7C, a function explanation is being displayed for a text string given as a button that has been put in proximity to the user's finger.

As illustrated in FIG. 7C, a function explanation, etc. may be displayed even in the case where the user's finger is put in proximity to an item other than an icon, such as a text string.

Meanwhile, an embodiment of the present technology is not limited to the embodiments discussed above, and various modifications are possible within a scope that does not depart from the principal matter of the present technology.

In other words, besides a digital camera, the present technology is also applicable to an apparatus that implements a user interface which displays items such as icons or text strings.

Also, besides icon or text strings, thumbnails of videos or still images may be adopted as the items displayed on the input/output panel 18.

For thumbnails of videos or still images displayed on the input/output panel 18, video or still image metadata such as the shooting date of the video or still image (in the case where the video is a television broadcast program, the date when that television broadcast program was recorded (broadcast)), the title, size (file size), etc. may be displayed as related information related to a thumbnail given as an item in the case where the user's finger, etc. is put in proximity.

Additionally, in the case where the user touches a thumbnail, the video or still image corresponding to that thumbnail may be played back.

Also, although the size and position were taken to be modified as the display state of an icon put in proximity to the user's finger, etc. in the present embodiment, other properties such as the color and brightness may be modified for an icon put in proximity to the user's finger, etc.

The present disclosure contains subject matter related to that disclosed in Japanese Priority Patent Application JP 2010-284320 filed in the Japan Patent Office on Dec. 21, 2010, the entire contents of which are hereby incorporated by reference.

It should be understood by those skilled in the art that various modifications, combinations, sub-combinations and alterations may occur depending on design requirements and other factors insofar as they are within the scope of the appended claims or the equivalents thereof.

What is claimed is:

1. A display control apparatus, comprising:
    a memory including instructions for execution by one or more processing circuitries coupled to the memory, the one or more processing circuitries configured to:
        detect a position of an object on a display screen based on a placement of the object above the display screen, wherein the object is placed at a determined proximity with the display screen in a non-contact manner;
        control a display of a plurality of areas on the display screen, wherein a first area of the plurality of areas includes a first displayed item and a first relation item, and a second area of the plurality of areas includes a second displayed item and a second relation item, and wherein the first area is adjacent to the second area;
    change the first displayed item and the second displayed item from a first size to a second size based on the detection of the position of the object midway between the first area and the second area;
    control a display of the first relation item along with a first function name associated with the first displayed item and a display of the second relation item along with a second function name associated with the second displayed item, based on the detection of the position of the object midway between the first area and the second area; and
    based on a movement of the object away from the display screen such that the object becomes undetectable with respect to the detected position on the display screen, change the first displayed item and the second displayed item from the second size to the first size, and remove the display of the first relation item and the display of the second relation item at a same time.

2. The display control apparatus of claim 1, wherein the one or more processing circuitries are further configured to change a size of at least one of the first displayed item or the second displayed item based on the detection of the object at a determined position above the display screen.

3. The display control apparatus of claim 1, wherein the one or more processing circuitries include a detector configured to detect that the object is at a determined position above the display screen.

4. The display control apparatus of claim 1, wherein at least one of the first relation item includes an explanation of a first function associated with the first displayed item.

5. The display control apparatus of claim 1, wherein the one or more processing circuitries are further configured to:
    detect a touch of the object on the display screen, and
    process the touch based on the object that is detected at the determined proximity with the display screen in the non-contact manner.

6. The display control apparatus of claim 1, wherein the one or more processing circuitries are further configured to delete third related information for areas other than the first area and the second area of the plurality of areas.

7. The display control apparatus of claim 1, wherein the one or more processing circuitries are further configured to cause the display of the first relation item and the second relation item at the same time.

8. The display control apparatus of claim 1, wherein the one or more processing circuitries are further configured to change a display state for a plurality of displayed items based on the detection of the object at a determined position above the display screen, wherein the plurality of displayed items is associated with the plurality of areas.

9. The display control apparatus of claim 8, wherein the one or more processing circuitries are further configured to cause a display of a plurality of relation items as text strings arrayed in a list format, wherein the plurality of relation items is associated with the plurality of displayed items.

10. The display control apparatus of claim 9, wherein the one or more processing circuitries are further configured to cause a display of the text strings as user-actuatable buttons.

11. The display control apparatus of claim 1, wherein the one or more processing circuitries are further configured to change at least one of a color or a brightness of at least one of the first displayed item or the second displayed item based on the detection of the object at a determined position above the display screen.

12. The display control apparatus of claim 1, wherein the one or more processing circuitries are further configured to delete related information for at least one of the first displayed item or the second displayed item that is away from the detected position of the object.

13. A display control method, comprising:
    in a display control apparatus:
        detecting a position of an object on a display screen based on a placement of the object above the display screen, wherein the object is placed at a determined proximity with the display screen in a non-contact manner;
        controlling a display of a plurality of areas on the display screen, wherein a first area of the plurality of areas includes a first displayed item and a first relation item, and a second area of the plurality of areas includes a second displayed item and a second relation item, and wherein the first area is adjacent to the second area;
        changing the first displayed item and the second displayed item from a first size to a second size based on the detection of the position of the object midway between the first area and the second area;
        controlling a display of the first relation item along with a first function name associated with the first displayed item and a display the second relation item along with a second function name associated with the second displayed item, based on the detection of the position of the object midway between the first area and the second area; and
        based on a movement of the object away from the display screen such that the object becomes undetectable with respect to the detected position on the display screen, changing the first displayed item and the second displayed item from the second size to the first size, and removing the display of the first relation item and the display of the second relation item at a same time.

14. The display control method of claim 13 further comprising changing a size of at least one of the first displayed item or the second displayed item based on the detection of the object at a determined position above the display screen.

15. The display control method of claim 13, wherein the first relation item includes an explanation of a first function associated with the first displayed item.

16. The display control method of claim 13, wherein the first relation item and the second relation item are displayed at the same time.

17. A non-transitory computer-readable device having stored thereon, computer-executable instructions that, when executed by a processing circuitry, cause the processing circuitry to execute operations, the operations comprising:
- detecting a position of an object on a display screen based on a placement of the object above the display screen, wherein the object is placed at a determined proximity with the display screen in a non-contact manner;
- controlling a display of a plurality of areas on the display screen, wherein a first area of the plurality of areas includes a first displayed item and a first relation item, and a second area of the plurality of areas includes a second displayed item and a second relation item, and wherein the first area is adjacent to the second area;
- changing the first displayed item and the second displayed item from a first size to a second size based on the detection of the position of the object midway between the first area and the second area;
- controlling a display of the first relation item along with a first function name associated with the first displayed item and a display of the second relation item along with a second function name associated with the second displayed item, based on the detection of the position of the object midway between the first area and the second area; and
- based on a movement of the object away from the display screen such that the object becomes undetectable with respect to the detected position on the display screen, changing the first displayed item and the second displayed item from the second size to the first size, and removing the display of the first relation item and the display of the second relation item at a same time.

18. A display control apparatus, comprising:
a memory including instructions for execution by one or more processing circuitries coupled to the memory, the one or more processing circuitries configured to:
- detect a position of an external object on a display screen based on a placement of the external object above the display screen, wherein the external object is placed at a determined proximity with the display screen in a non-contact manner;
- control a display of a plurality of areas on the display screen, wherein a first area cacti of the plurality of areas includes a first displayed item and a first relation item, and a second area of the plurality of areas includes a second displayed item and a second relation item, and wherein the first area is adjacent to the second area;
- change the first displayed item and the second displayed item from a first size to a second size based on the detection of the position of the external object midway between the first area and the second area;
- control a display of the first relation item along with a first function name associated with the first displayed item and a display of the second relation item along with a second function name associated with the second displayed item, based on the detection of the position of the external object midway between the first area and the second area;
- hide function names associated with displayed items other than the first displayed item and the second displayed item; and
- based on a movement of the external object away from the display screen such that the external object becomes undetectable with respect to the detected position on the display screen, change the first displayed item and the second displayed item from the second size to the first size, and remove the display of the first relation item and the display of the second relation item at a same time.

* * * * *